United States Patent [19]

Putz

[11] 4,449,298
[45] May 22, 1984

[54] HAND-OPERATED APPARATUS FOR PEELING OFF THE OUTER JACKET LAYER OF ELECTRIC LINES AND CABLES

[75] Inventor: Wilhelm Putz, Kersbach, Fed. Rep. of Germany

[73] Assignee: Siemens Aktiengesellschaft, Berlin and Munich, Fed. Rep. of Germany

[21] Appl. No.: 397,441

[22] Filed: Jul. 12, 1982

[30] Foreign Application Priority Data

Jul. 22, 1981 [DE] Fed. Rep. of Germany ....... 3129014
Apr. 19, 1982 [DE] Fed. Rep. of Germany ....... 3214479

[51] Int. Cl.³ .............................................. H02G 1/12
[52] U.S. Cl. ..................... 30/90.1; 30/90.8; 81/9.5 R
[58] Field of Search ............ 30/90.1, 91.2, 90.7, 30/90.8; 81/9.5 R

[56] References Cited

U.S. PATENT DOCUMENTS

| | | | |
|---|---|---|---|
| 3,433,106 | 3/1969 | Matthews | 81/9.5 R |
| 3,710,654 | 1/1973 | Halverson | 81/9.5 R |
| 3,869,791 | 3/1975 | Horrocks | 30/90.1 |
| 3,978,582 | 9/1976 | Maytham | 30/90.1 |
| 4,059,893 | 11/1977 | Solury | 30/90.1 |

FOREIGN PATENT DOCUMENTS 196056  5/1938 Switzerland ................. 30/90.8

Primary Examiner—Jimmy C. Peters
Attorney, Agent, or Firm—Kenyon & Kenyon

[57] ABSTRACT

A hand-operated device for peeling off the outer jacket layer of an electric cable is disclosed. The device has three guide jaws slidably mounted on a support disc and directed radially toward the center of the disc. The guide jaws have a concave, threaded surface for engaging the cable and feeding the cable through an aperture in the center of the support disc. A peeling knife is mounted to one of the guide jaws for peeling off the cable jacket layer as the device is turned by means of a handle mounted to the support disc and the cable fed into the knife by the guide jaws. The peeling knife is continuously adjustable radially so that it can accommodate jacket layers of varying thicknesses. The guide jaws are adjusted by means of a rotatable adjusting disc having spiral slots which engage the guide jaws to thus accommodate cables of varying diameters.

13 Claims, 6 Drawing Figures

HAND-OPERATED APPARATUS FOR PEELING OFF THE OUTER JACKET LAYER OF ELECTRIC LINES AND CABLES

BACKGROUND OF THE INVENTION

The present invention relates to devices for peeling off the outer jacket layer of electric lines and cables, and particularly to a hand-operated device for peeling off the outer jacket of electric lines and cables in which the device has a guide with an adjustable peeling knife which can be set to the diameter of the conductor or cable.

To prevent corona discharges in high-voltage cable insulation made of thermoplastic materials, a conductive layer such as a graphite containing thermoplastic layer is often applied as the outer jacket. At the joints and the terminal ends, this conductive layer must be removed without a trace. A surface as uniformly smooth as is possible must be obtained when removing the conductive layer in order to permit the attachment of protective cable sleeves.

The hand-operated peeling tools known in the art work generally in the axial direction. Other devices are also know which peel off the conductive layer helically at the circumference of the jacket. The surface quality attainable with these devices as well as their ease of handling are still very inadequate and in need of improvement.

SUMMARY OF THE INVENTION

It is an object of the present invention to develop an improved hand-operated device of the type mentioned which removes the graphite-containing thermoplastic layer at the jacket surface of high-voltage cables in a predetermined area in such a manner that the substantially even, irregularity free and groove-free surface required for the attachment of cable sleeves is obtained.

This and other objects of the present invention are achieved in a hand-operated apparatus having a guide comprising three radially movable guide jaws which are fastened on a support disc and a peeling knife arranged on one of the guide jaws so that it can be set and adjusted in the radial direction continuously and without increments. The guide jaws are provided with concave running surfaces having a given pitch in the form of a truncated thread for facilitating the feeding of the electric cable into the peeling knife. The guide jaws can be adjusted to the diameter of the cable by means of an adjusting disc provided with spiral slots which engage the guide jaws, and an operating handle fastened to the support disc provides means for turning the device around the electric cable. The peeling knife is arranged on a peeling knife carrier which is radially movable by a knurled screw and which preferably is locked into position by means of a clamping lever. Furthermore, the adjusting disc can be locked by means of a second clamping lever, in order to lock the guide jaws to a particular cable diameter.

These and other objects of the present invention will be described in greater detail in the following detailed description.

DETAILED DESCRIPTION

Figure 1:
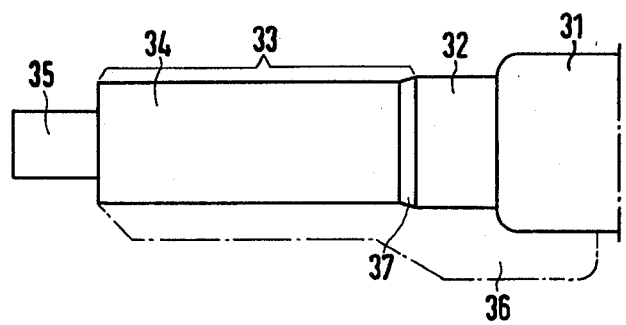
FIG. 1 is a partial view of an high-voltage electric cable.

With reference to the drawings, FIG. 1 is a partial view of an electric high-voltage cable. The cable comprises wire armor or shield 31, conductive layer 32, insulation 34, and conductor 35. A silicone-rubber sleeve 36 show by the dashed lines is slipped over the end of the cable. The length of the conductive layer 32 removed in order to fasten sleeve 36 is shown as 33.

Figure 2:
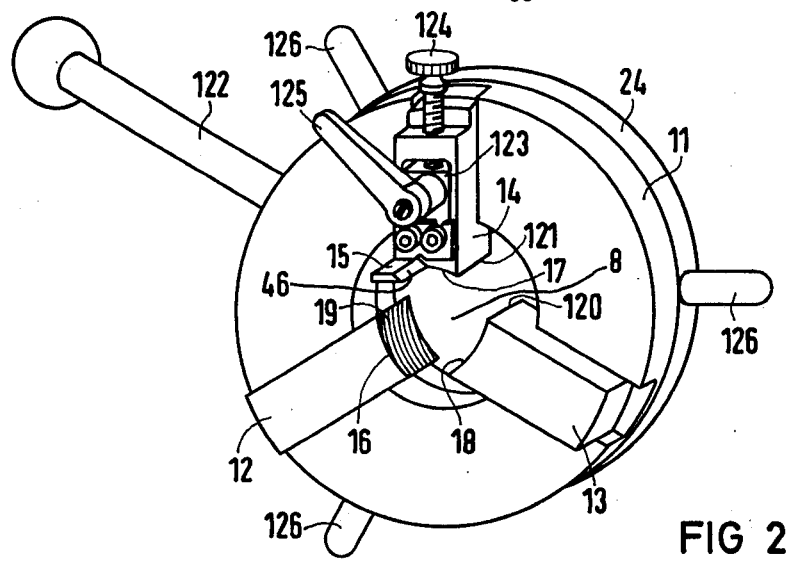
FIG. 2 is a perspective front view of one embodiment of a hand-operated device according to the invention.
Figure 3:
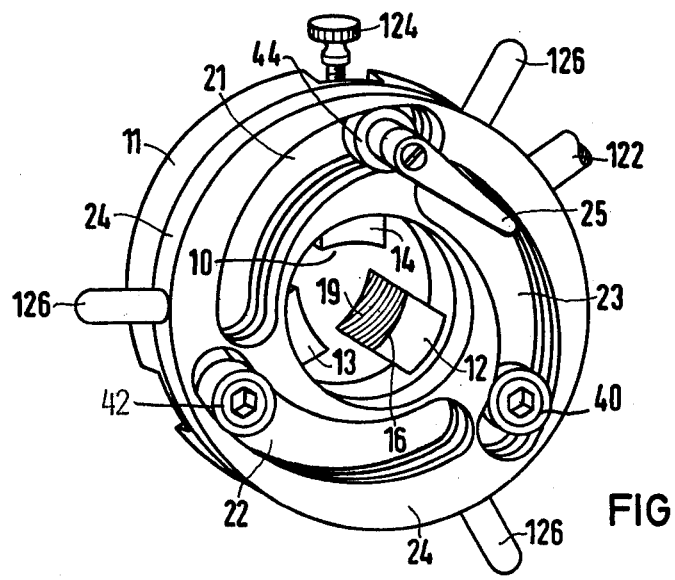
FIG. 3 is a perspective rear view of the hand-operated device of FIG. 2.

FIGS. 2 and 3 illustrate the front and rear of the hand-operated device according to the invention in perspective view. The construction of the hand-operated device is particularly compact and light. A support disc 11 has an aperture 8 therein for receiving an electric cable to be peeled. On the support disc 11 are fastened three guide jaws 12, 13 and 14 which can be adjusted and set radially in slots in the support disc. The guide jaws 12, 13 and 14 are made very short axially, for instance, 20 mm. Along the running surfaces 16, 17 and 18 the guide jaws are made concave in order to conform to the surface of the electric cable and thus provide the best possible guidance of the device to the jacket of the cable. The guide jaws 12, 13 and 14 are adjusted and set to the jacket diameter of the cable by means of adjusting disc 24 which is rotatable relative to the support disc 11 and has three spiral slots 21, 22 and 23 which engage with projections 40, 42 and 44 of the guide jaws 12, 13 and 14 for moving the guide jaws radially in their slots. An aperture 10 for receiving the electric cable is located in the center of the adjusting disc and is aligned with aperture 8 of the support disc. In the embodiment shown in FIGS. 2 and 3, the peeling knife 15 is fastened directly to peeling knife carrier 123, which is in turn slidably mounted in guide jaw 14. Thus, the peeling knife itself is radially adjustable with respect to the guide jaw, so that various peeling depths may be obtained. A knurled thumbscrew 124 allows radial adjustment of the peeling knife.

Because of the relatively short axial length of the hand-operated device according to the invention, it is possible to peel up to 20 mm to the edge of the braided shield 31 disposed on top of the conductive layer 32, thus permitting a shortening of the length of the sleeve 36. Into the concave running surfaces 16, 17 and 18 of the guide jaws 12, 13 and 14 a predetermined pitch is machined in the form of a truncated thread 19, 120 and 121. A trapezoidal thread, for instance, may be used. The thread is designed so that a reliable axial feed of the cable is ensured without functional damage to the surface of the conductive layer 32. The feed per revolution is adjusted for the chip width determined as advantageous, i.e., so that the full chip removal capacity is utilized in each revolution. Due to the fact that the feed function is assigned to the running surfaces 16, 17 and 18, the overall length of the device can be kept small. The forced feed movement makes it unnecessary to apply force in the axial direction during operation, and thus ease of handling is facilitated. By adjusting the guide jaws 12, 13 and 14 to the cable diameter, the peeling knife 15 is at the same time brought into operating position. The peeling knife 15 itself can be moved and adjusted continuously on the jaw 14 in the radial direction. The peeling knife 15 is adjusted by radially moving the peeling knife carrier 123. The peeling knife carrier 123 can be locked into position by means of the clamping lever 125 which can take the form of any convenient clamping means, such as a lever coupled to a screw which engages against the support disc when tightened. The cutting depth is adjusted only once by the knurled screw 124 and is locked by the clamping lever 125. A cutting angle of 30° to 45° was determined as the optimum design for the cutting edge 46 of the peeling knife 15. The cutting edge is ground at an angle along its rear surface so that an angle of only about 15° is obtained at the transition 37 of the conductive surface 32 to the peeled surface 33 of the cable. This gentle angle is necessary for a voidless fit of the cover sleeve 36 to the cable. In addition, the peeling knife 15 is arranged so that the tip of the cutting edge 46 cuts 1 to 2 mm above the tangential point of contact with the circumference of the cable for a diameter range of 15 to 45 mm. This allows the peeling knife 15 to be lightly supported by the freshly produced surface of the insulator 34, and a particularly uniform surface is therefore obtained. The cutting forces produced are so small that the tool can be rotated with one finger. The tool is rotated around the cable by means of an operating handle 122. The pins 126 are used to rotate the adjusting disc 24 and thus move the guide jaws 12, 13 and 14 radially with respect to the support disc.

A region of a high-voltage cable which is particularly critical with respect to dielectric strength is the transition zone 37 from the exposed surface 33 to the conductive surface 32. In this region, the conductive layer jacket 32 should be frayed as little as possible and run out obliquely in a gentle transition of about 15° over a length of about 2 to 3 mm. As explained, the device of the present invention allows these objects to be attained.

These above-mentioned requirements cannot be met with the tools and fixtures known to date in the art. In all tools and fixtures known to date, the cutting edge geometry is not optimized. The cutting angle is generally too small, which produces a fuzzy or frayed surface. Furthermore, the setting of the knife edge is practically not reproducible, since a new setting is necessary for any change to a different cable diameter.

In operation, the hand-operated device is applied to the end of the cable like a threading die and the adjusting disc 24 is rotated by pins 126 until the guide jaws contact the cable jacket. The adjusting disc 24 is then locked by means of the clamping lever 25 which is similar to clamping lever 125 for the peeling knife, thus locking the guide jaws into position. The peeling knife depth is then adjusted by means of screw 124 and lever 125. The device is then turned clockwise into the cable by means of the operating handle 122, thus peeling the conductive jacket 32 away from insulation 34.

So as not to obtain a frayed edge at the transition zone 37 between the conductive layer 32 and the peeled surface 34, the device is brought against a fixed stop. The feed then slides through and the chip runs out.

Figure 4:
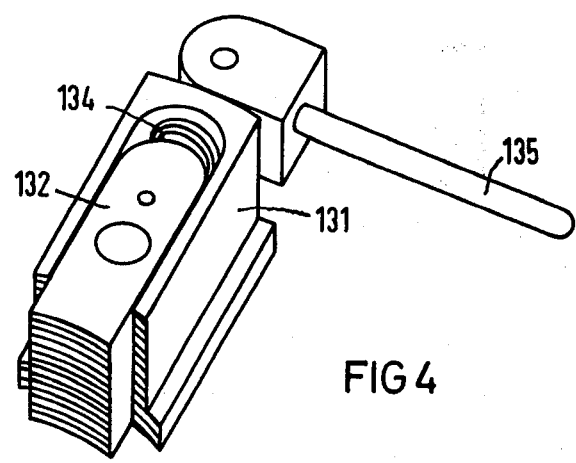
FIG. 4 is a perspective front view of one embodiment of a resiliently mounted guide jaw.
Figure 5:
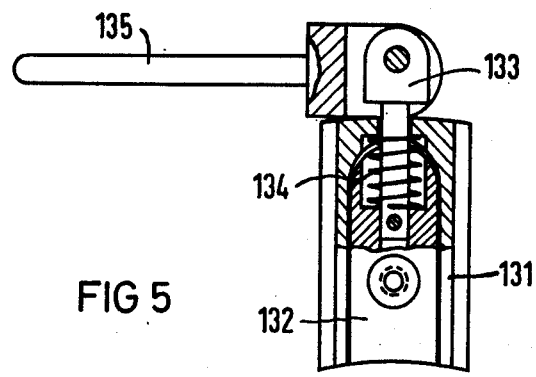
FIG. 5 is a cut-away front view of the guide jaw of FIG. 4.

For larger cable diameters it may be found to be advisable to support at least one of the guide jaws resiliently in the radial direction in order to equalize deviations of the cable circumference from the true circular form and so as to improve the peeling process. FIGS. 4 and 5 show an embodiment of a resiliently mounted guide jaw by way of example. The guide jaw 132 is inserted into a slot extending in the longitudinal direction of a holding block 131 which in turn is guided in a radial slot of the support disc 11 and which can be locked in the radial slot of the support disc by operation of the clamping lever 25, as shown by the guide jaw 13 in FIG. 3. Axial forces arising during the peeling process can be taken up better and more uniformly if the radial slots of the support disc 11 containing the guide jaws or holding block are made wider toward the bottom of the slot, i.e., are dovetail-shaped or T-shaped. Accordingly, the holding block shown in FIG. 4 has a T-shaped bottom section which is inserted into the correspondingly shaped slot of the support disc 11. The guide jaws which are not resiliently mounted in holding blocks but which are only slidably mounted in the support disc 11 are also made so that they fit into dovetail or a T-shaped slots. The holding block 131 has a slot which extends in its longitudinal direction and in which the guide jaw 132 is radially movable. A tension bolt 133 is pinned to the guide jaw 132 and permits the latter to be moved against the force of a compression spring 134 which is braced at its ends against the holding block 131 and by a hole at the bottom of the guide jaw 132. An eccentric lever 135 is pivotally linked to the tension bolt 133. If the guide jaws are to be moved toward the cable, the eccentric lever is first placed in the position shown in FIG. 5, whereby the guide jaw 132 is retracted farthest into the slot of the holding block 131. After the jaws are set to the cable diameter, the eccentric lever is switched and the force of the spring now pushes the guide jaw against the cable jacket so that the jaw can follow an out of round cable circumference, and thus secure guidance of the cable jacket is ensured.

Figure 6:
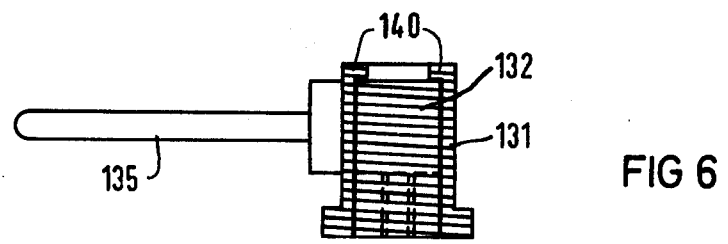
FIG. 6 is a bottom view of an alternative embodiment of a resiliently mounted guide jaw.

FIG. 6 shows an embodiment of the slot of the holding block 131 containing the guide jaw 132 which is supported resiliently in the radial direction, and which allows forces occurring in the axial direction to be taken up by the holding block. This slot is not open at the top as shown in FIGS. 4 and 5, but extends around the guide jaw 132 at the top as shown at 140. Alternatively, a circular slot cross section may be used to hold the guide jaw in place for production reasons. If such a circular slot cross section is used, then the maximum slot depth would have to be made larger than the radius of the circle, so that the holding block can take up axial forces.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a hand-operated device for peeling off the outer jacket layer of an electric cable, said device having an adjustable peeling knife which can be adjusted to the diameter of the cable, the improvement comprising:

support disc means having an aperture therein for receiving said cable and operating handle means for turning said support disc means fastened thereto;

guide means having three radially adjustable guide jaws movably mounted to said support disc means and directed toward the center of said aperture, each of said guide jaws having a concave end for engaging said cable, said concave end having a truncated threaded surface so that when said support disc means is turned said cable will be fed into said peeling knife;

means for adjustably fastening the peeling knife to one of said guide jaws so that said peeling knife is continuously movable in the radial direction with respect to said guide jaw and the cutting edge of said peeling knife can be extended past said concave end of said guide jaw to cut into said cable; and rotatable adjusting disc means adjacent said support disc means and having an aperture therein for receiving said cable disposed in alignment with said aperture in said support disc means, said adjusting disc means including a spiral slot for each guide jaw engaging said guide jaw so that each said guide jaw is radially adjustable to the diameter of said cable;

whereby when said operating handle means is turned around said cable, said peeling knife engages the outer jacket of said electric cable and peels said outer jacket from said cable.

2. The improvement recited in claim 1 and further comprising means for resiliently supporting at least one of said guide jaws in the radial direction.

3. The improvement recited in claim 2 wherein said means for resiliently supporting comprises:

a holding block having a slot having an open end and closed end into which said guide jaw is movably inserted, said holding block movably fastened to said support disc means; and compression spring means disposed between said guide jaw and said closed end of said slot for urging said guide jaw radially.

4. The improvement recited in claim 3 and further comprising means for adjustably moving said guide jaw in said holding block.

5. The improvement recited in claim 4 wherein said means for adjustably moving comprise:

a two position lever having an eccentric end slidably engaging said holding block; and a link pivotally coupling said guide jaw to said lever, whereby when said lever is in said first position said guide jaw is pulled into said slot in said holding block against said spring means and when in said second position, said guide jaw extends out of said open end of said slot.

6. The improvement recited in claim 1 or 2 wherein said support disc means has radially extending slots for slidably receiving each of said guide jaws, each of said slots having a substantially wider cross section at the bottom thereof for holding each of said guide jaws in said slots.

7. The improvement recited in claim 3, 4 or 5 wherein said support disc means has radially extending slots for slidably receiving each of said holding blocks, each of said slots having a substantially wider cross section at the bottom thereof for holding each of said holding blocks in said slots.

8. The improvement recited in claim 5 wherein said holding block has projecting member means at the top thereof extending partially around said guide jaw.

9. The improvement recited in claim 1 wherein said means for adjustably fastening comprises carrier means for said peeling knife slidably mounted to one of said guide jaws, said carrier means urged radially by screw means engaging said carrier means.

10. The improvement recited in claim 8 and further comprising means for clamping said carrier means in fixed position to said guide jaw.

11. The improvement recited in claim 1 or 9 wherein said peeling knife has a cutting edge angle of 30° to 45°.

12. The improvement recited in claim 11 wherein said peeling knife has an edge facing said support disc means, said edge being ground at an angle to the longitudinal axis of said cutting edge.

13. The improvement recited in claim 1 and further comprising means for clamping said adjusting disc means to said support disc means.

* * * * *